May 5, 1936.     F. VETORINO     2,039,857
WELDING MACHINE
Filed Sept. 15, 1932     2 Sheets-Sheet 1

INVENTOR
Frank Vetorino
BY
Brockett, Hyde, Higley & Meyer
ATTORNEYS

May 5, 1936.　　　　F. VETORINO　　　　2,039,857
WELDING MACHINE
Filed Sept. 15, 1932　　　　2 Sheets-Sheet 2

INVENTOR
Frank Vetorino
BY
Brockett, Hyde, Higley & Meyer
ATTORNEYS

Patented May 5, 1936

2,039,857

UNITED STATES PATENT OFFICE 2,039,857

WELDING MACHINE

Frank Vetorino, Cincinnati, Ohio, assignor to The American Laundry Machinery Company, Cincinnati, Ohio, a corporation of Ohio Application September 15, 1932, Serial No. 633,313

8 Claims. (Cl. 219—4)

My invention relates to spot welding apparatus and, particularly, to a spot welding apparatus of the type adapted for use in welding washing machine cylinders, tubs, and the like, wherein there is difficulty in aligning and maintaining the welding electrodes in welding alignment where one or both electrodes are held in position by hand. The invention includes numerous features relating to positioning and clamping the welding electrodes that greatly facilitate the welding operation.

One object of my invention is to provide a spot welding apparatus adjustable to easily position the welding electrodes at any desired point and rigidly maintain them in that position and in point alignment with each other while welding, to thereby easily and successfully weld any parts of a washing machine cylinder or the like without danger. In this instance, this is accomplished by providing a power actuated mechanism for rotating the necessarily heavy parts-carrying carriage by which the electrodes are carried to present the electrodes at any point within a given horizontal radius, together with means for adjusting the carriage vertically and means for moving the electrodes horizontally inwardly and outwardly to and from a given point. Further, the lower electrode holder and electrode are arranged to be adjusted vertically and also in vertical and horizontal arcuate paths with suitable clamping means for rigidly maintaining the lower electrode holder and electrode in any position to which they are adjusted, suitable actuating and control means being provided for all these hereinbefore mentioned adjustments and movements.

Another object of my invention is to provide an operator support in proximity to the controls for operating the apparatus, this support serving to render the apparatus more flexible by permitting the operator to be within reach of the controls regardless of the height or position of the electrode-carrying carriage.

Various other objects and advantageous features of my invention will be seen in the following description and one embodiment thereof may be seen in the accompanying drawings wherein similar characters of reference designate corresponding parts, and wherein.

Figures 1, 2:
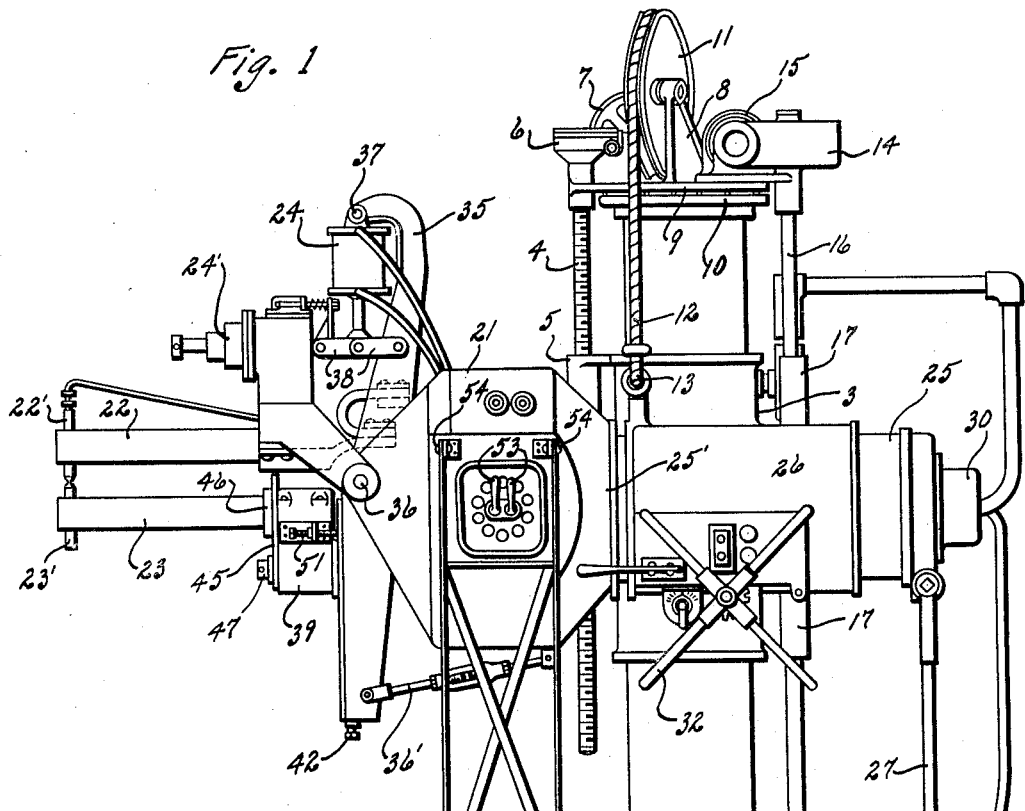
Fig. 1 is a side elevation of a spot welding apparatus constructed in accordance with my invention.
Fig. 2 is a fragmentary view of the rearward side of the apparatus shown in Fig. 1 and showing a part of the mechanism for moving the electrodes to any point within a given vertical radius.

Referring to the drawings, I have shown one embodiment of my invention as comprising a spot welding apparatus wherein means are provided for universally adjusting the position of the welding electrodes, and consisting of a base 1 carrying a vertically extending pillar or column 2 on which a carriage 3 that supports the entire active welding parts of the apparatus is vertically slidable and rotatably mounted as a part of such universal adjustment.

Mechanical means are provided for accomplishing the vertical movement of the carriage and the parts, including the electrodes, carried thereby, to the desired level consisting of a lead screw 4 that operates in a threaded sleeve 5 rigidly attached to or forming a part of the carriage 3. The lead screw 4 is adapted to be rotated to raise or lower the carriage 3 by a motor driven gear reduction unit 6 driven by a motor or power unit 7.

A counterweight means is provided for reducing the weight of the carriage 3 to a minimum to ease the raising and lowering of the carriage and reduce the strain on the raising and lowering mechanism. As shown in Fig. 1, a pair of brackets 8 are fixedly mounted on a revolving base 9 that is disposed to rotate on a cap 10 rigidly mounted on the extreme upper end of the column 2. These brackets support a sheave wheel 11 over which a cable 12 passes, the cable 12 having one end thereof secured to the carriage 3 as at 13, with its opposite end extending downwardly inside the column 2 and having a counterweight (not shown) attached thereto. By proportioning the weight of the carriage 3 and the counterweight provided, the weight of the carriage 3 as regards the power necessary to raise or lower the carriage may be reduced to a minimum as will be readily apparent.

The means for rotating the carriage 3 about the column 2 for further adjustment of the position of the electrodes is mechanical and consists of a motor driven gear reduction 14 driven by a motor unit 15 supported on the rotatable base 9. Extending from the gear reduction unit 14 is a vertical shaft 16 arranged to rotate in a bearing 17 that is fixedly mounted to the carriage 3 by means of brackets 18 as shown in Fig. 2, sufficient clearance being provided in this bearing to allow for free movement of the shaft 16 when rotating, and free movement of the carriage 3 while being raised or lowered. A pinion 19 is rigidly mounted on the extreme lower end of the shaft 16 and is disposed to engage a ring gear 20 rigidly mounted on the base 1. With this construction, when it is desired to rotate the carriage 3 about the pillar or column 2 as an axis, the motor 15 is set in motion to drive the pinion 19 which, meshing with the ring gear 20, will cause such rotation of the carriage 3, the carriage being adapted to be rotated through 360° and either clockwise or counterclockwise about the column 2.

Figure 6:
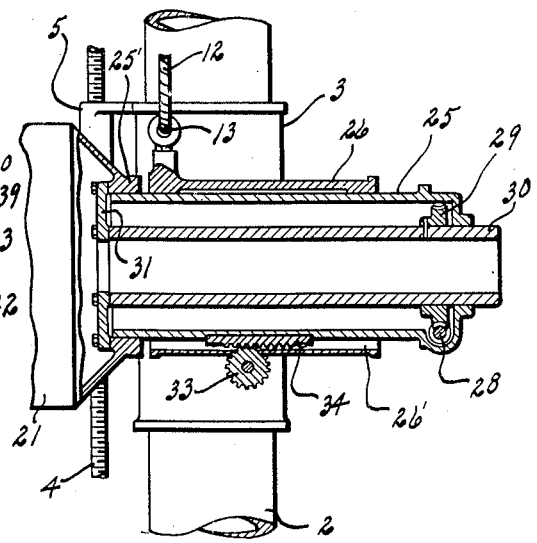
Fig. 6 is a sectional view taken on the line 6—6 of Fig. 2 showing the mechanism for moving the electrode carrying frame in a horizontal line and rotatably about a center.

The welding unit consists of a transformer 21, an upper welding electrode arm 22 carrying an electrode 22', a lower electrode arm 23 carrying an electrode 23' adapted to cooperate with the upper electrode arm, and a pressure mechanism 24 for moving the upper electrode arm 22 towards and away from the lower electrode arm 23. The transformer 21 is rotatably mounted on a sleeve 25 by means of a bearing 25' (see Fig. 6), the sleeve 25 being offset from the center line of the column 2 as shown in Fig. 2 and being slidably mounted in a sleeve 26 forming a part of the carriage 3. The transformer 21 and associated parts is rotated by a manually operated ratchet lever 27 that operates a worm 28 and worm gear 29 disposed within the sleeve 25, the worm gear 29 being pinned on a hollow shaft 30 extending through the sleeve and attached to the transformer 21 and associated parts by means of a plate 31.

Longitudinal movement of the transformer 21 and associated parts to move the electrodes 22' and 23' radially outwardly from the post 2 is effected by means of a hand wheel 32 and a pinion 33 operable by the hand wheel and meshing with a rack 34 carried by the slidable sleeve 25. In order that the rack and pinion will always remain in correct relationship, a slot 26' is provided in the sleeve 26 approximately the same width as the rack 34, the rack being adapted to slide along this slot as the sleeve 25 is moved in one direction or the other in the sleeve 26.

Referring to Fig. 1, the electrode arms 22 and 23 and their electrodes 22' and 23' are carried by an arm 35 that is pivotally mounted as at 36 on the transformer 21, the arm being adjustable and held in adjusted position by an eye and link 36' connected to the lowermost end of the arm 35 and to the transformer 21. The purpose of this adjustable mounting is to permit swinging of both electrode arms and electrodes upwardly and downwardly in a vertical plane. The electrode arm 22, aside from its connections with the arm 35, is likewise pivotally mounted at 36 and is movable toward and from the electrode arm 23 by the pressure applying mechanism 24 consisting of a cylinder and piston pivotally suspended as at 37 at the upper end of the arm 35 and operating a toggle 38 connected to the electrode arm 22 and the arm 35. The degree of pressure is adjusted by a pressure adjusting mechanism 24'. With this construction, when the piston in the pressure applying mechanism moves upwardly, the toggle 38 is broken and the electrode arm 22 moved upwardly about the pivot 36 to move the electrode 22' away from the electrode 23'. Reversely, when the piston moved downwardly, the toggle 38 is straightened as shown in Fig. 1 and the electrode arm 22 moved downwardly to bring the two electrodes into operative position.

Means have been provided for practically universally adjusting the lower electrode arm 23 to bring the electrode carried thereby into any position desired for the welding operation, to enable the electrode to be inserted into a cylinder or the like through a narrow opening extending in a direction different from the longitudinal axis of the electrode, and to permit the use of an offset electrode arm for certain welding operations. That is, the lower electrode arm 23' is movable up and down vertically, swingable in a horizontal plane through 180°, and movable arcuately in a vertical plane.

Figure 4:
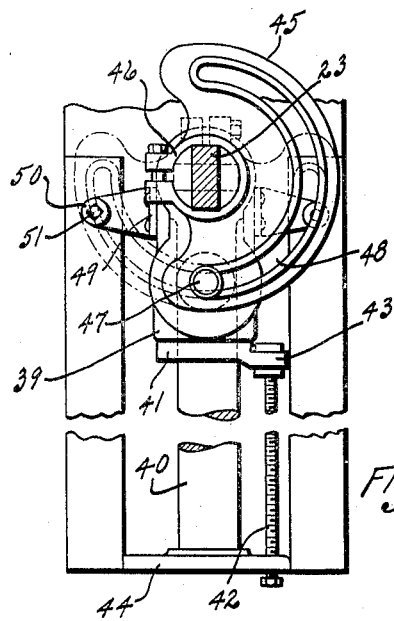
Fig. 4 is a plan view of the front side of the lower electrode arm mounting.
Figure 3:
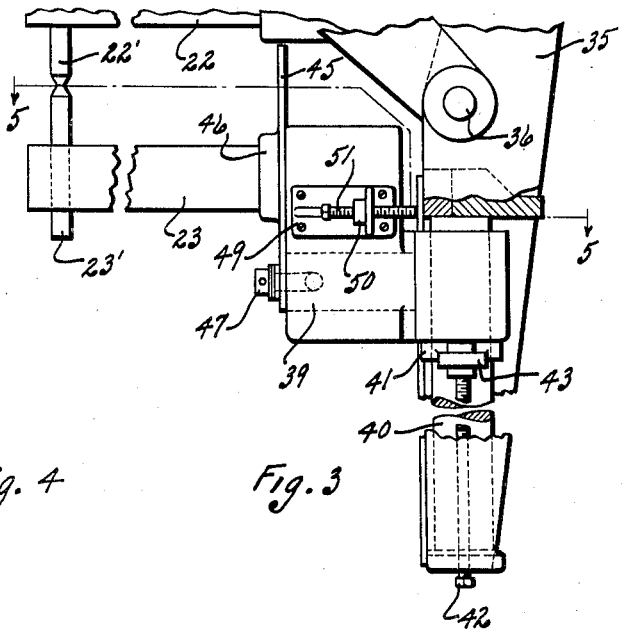
Fig. 3 is an enlarged side elevation, with parts broken away and parts in section, showing the lower electrode arm construction and mounting.

To move the electrode arm 23 and electrode 23' up and down vertically for adapting the welding apparatus to operations on work of different thicknesses, it will be noted in Fig. 4, that the electrode arm is carried by a sleeve 39 slidably mounted on a shaft 40 which is rigidly mounted in and carried by the arm 35, see Fig. 3. A detachable collar 41 surrounds the shaft 40 and supports the weight of the sleeve 39 by means of a lead screw 42 having one of its ends threaded into a lug 43 on the collar 41 and having its opposite end threaded through the stationary portion 44 of the arm 35. Thus, when the lead screw 42 is rotated in one direction, the collar 41, sleeve 39, electrode arm 23 and electrode 23' are raised. Reversely, when the lead screw 42 is rotated oppositely, the collar 41 is lowered, with the sleeve 39, electrode arm 23 and electrode 23' following the collar downwardly by reason of their own weight.

The means for adjusting the electrode arm 23 arcuately in a vertical plane is particularly advantageous in permitting the insertion of the electrode 23' through an opening that extends in a direction other than that of the longitudinal axis thereof, and consists of a segment 45 rigidly mounted on the electrode arm 23 by means of a collar 46. A locking pin or screw 47 carried by the sleeve 39 is disposed in a slot 48 in the segment 45. In making welds where it is necessary to insert a long electrode 23' into the cylinder through an opening extending in a direction other than that of the longitudinal axis of the electrode, the locking screw 47 is loosened and the segment 45 is rotated to place the electrode in the desired position which permits it to be inserted into the cylinder. Then, the electrode arm, electrode and segment are rotated in the opposite direction until the end of the slot 48 strikes the locking screw 47 which indicates that the electrode is in a position wherein it will register with the upper electrode. Then, the locking screw 47 is tightened to hold the electrode in this position.

Figure 5:
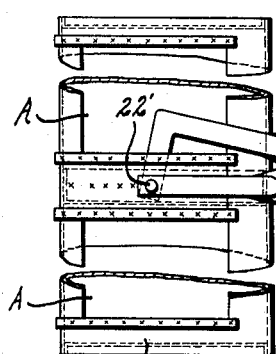
Fig. 5 is a view, partly in section and partly in elevation taken on line 5—5 of Fig. 3, showing the mounting and clamping means for moving and holding the lower electrode when an offset electrode arm is used, the electrodes being shown in welding position relative to a cylinder.

The swivel adjustment or swinging of the electrode arm 23 and electrode 23' in a horizontal plane through 180° is desirable when reaching into a cylinder to make welds at difficult positions or those positions which require the use of an offset electrode arm as shown in Fig. 5 wherein the partition intermediate the door openings A of a cylinder B is being welded. An adjustment is therefore provided permitting the use of the offset electrode arm while still making possible the registry of the upper and lower electrode points for a successful welding operation. This swivel adjustment or swinging movement is accomplished by a pair of clamps 49, one on each side of the electrode arm 23 which is carried by the sleeve 39 loosely mounted on the shaft 40. Each of the clamps 49 includes an outwardly extending arm 50 having a threaded opening therein through which an adjusting screw 51 extends, the free ends of the adjusting screws 51 bearing against the outer surface of the arm 35 and having lock nuts 52 thereon to hold them in their adjusted position. As shown in Fig. 5, by turning one of the adjusting screws 51 in one direction and the other screw in the opposite direction, after first loosening the lock nut 52, the electrode arm 23 may be swung in a horizontal plane to any position throughout an arc of substantially 180° wherein, with an offset electrode arm the electrode may be moved through an opening laterally of the point to be welded and then brought into alignment with its cooperating electrode. Then, by tightening the lock nuts 52, the electrode arm 23 may be rigidly held in its adjusted position in alignment with the other electrode.

Figure 7:
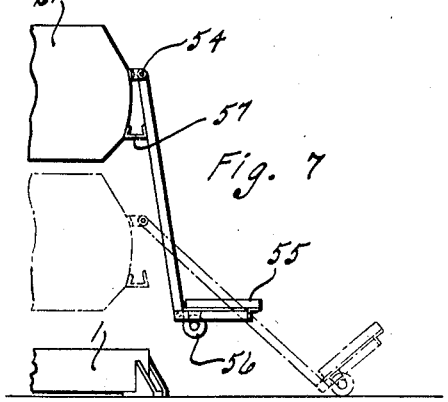
Fig. 7 is a view showing the operator support provided.

Another feature of my invention consists in the provision of an operator supporting platform that, as shown in Figs. 1 and 7, is pivotally suspended as at 54 from the transformer 21 which carries various operating control means 53 and includes a platform 55 on which an operator may stand to be always in a position convenient to the apparatus controls regardless of the height to which the transformer and welding electrodes are raised. A roller 56 is provided on the bottom of the platform 55 whereby, when the transformer and welding electrodes are lowered through considerable distance, the roller 56 will strike the floor and the platform will swing outwardly at its lower end away from the transformer and electrodes. A stop 57 is provided on the transformer 21 which will maintain the operator support angled outwardly therefrom so that the lower end of the support will move outwardly away from the base 1 when the transformer is lowered. Of course, suitable wiring and other power connections are provided for operating purposes.

What I claim is:

1. Spot welding apparatus, comprising an upstanding pedestal, a rotatable and vertically movable frame carried thereby, welding means carried by said frame including a pair of electrode arms, registering electrodes carried thereby, and means for moving one of said arms to bring the electrode carried thereby into and out of welding relation with the electrode carried by said other arm, said last named arm being adjustable vertically to accommodate work of various thicknesses, and being adjustable in an arcuate path horizontally and also being rotatable about its own axis to permit the lower electrode to be inserted through an opening extending in a direction different from the longitudinal axis of said electrode.

2. Welding apparatus comprising an upstanding pedestal, a frame mounted on said pedestal for vertical movement and for rotation, a freely rotatable base mounted on said pedestal, means for moving said frame mounted on said base, there being one power driven connection for moving said frame vertically and a second power driven connection for rotating said frame and base, a pair of welding electrodes carried by said frame, and means for supplying welding current to said electrodes.

3. Spot welding apparatus comprising an arm, an electrode carrying arm pivotally mounted on said first named arm, means for moving said electrode arm axially of said pivot, and means for clamping said electrode arm in various radial positions about said pivot.

4. Spot welding apparatus comprising a supporting arm, an electrode carrying arm pivotally mounted on said first named arm, means for moving said electrode arm axially of said pivot and an adjusting member between said arms for clamping said electrode arm in fixed relation to said supporting arm in various radial positions about said pivot.

5. Welding apparatus, comprising a frame carrying a pair of welding electrodes, means for supplying current to said electrodes, means for raising and lowering said frame relative to a supporting surface, an operator's platform pivotally carried by the frame, and means operable by contact of said platform with said surface upon the lowering of the frame for moving the platform away from the path of travel of the frame.

6. Welding apparatus comprising a frame carrying a pair of welding electrodes, means for supplying current to said electrodes, means for raising and lowering said frame relative to a supporting surface, an operator's platform having a support pivoted at its upper end to the frame and depending below said pivot in a position sloping downwardly and outwardly from the frame, and a roller below said platform adapted to contact said surface when the frame is lowered.

7. Apparatus of the class described comprising an upstanding pedestal, a frame mounted on said pedestal for rotation thereabout, a welding electrode or the like carried by said frame, and means for rotating said frame about said pedestal comprising a base rotatable about the upper end of said pedestal, motor means on said base, a vertical shaft rotatable by said motor means and supported in fixed relation to said base, a bracket on said frame freely embracing said shaft, a pinion rigidly mounted on the lower end of said shaft and meshing with a stationary ring gear extending about said pedestal.

8. Apparatus of the class described comprising a vertical pedestal, a frame mounted on said pedestal for vertical movement therealong and for rotation thereabout, a welding electrode or the like carried by said frame, and means for moving said frame comprising a base rotatable about said pedestal, two vertical shafts supported in fixed relation to said base and spaced about said pedestal, motor means for rotating said shafts, there being openings in said frame embracing said shafts, one of said shafts having a threaded connection with the frame, and the other shaft having a driving connection with a stationary ring gear extending about said pedestal.

FRANK VETORINO.